United States Patent
Yamaguchi

(10) Patent No.: US 12,086,364 B2
(45) Date of Patent: Sep. 10, 2024

(54) OPERATION DETECTION DEVICE

(71) Applicant: KABUSHIKI KAISHA TOKAI RIKA DENKI SEISAKUSHO, Aichi (JP)

(72) Inventor: Syogo Yamaguchi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 233 days.

(21) Appl. No.: 17/868,373

(22) Filed: Jul. 19, 2022

(65) Prior Publication Data

US 2023/0022102 A1 Jan. 26, 2023

(30) Foreign Application Priority Data

Jul. 26, 2021 (JP) ................................. 2021-121866

(51) Int. Cl.
*G06F 3/044* (2006.01)
*G06F 3/041* (2006.01)

(52) U.S. Cl.
CPC .......... *G06F 3/044* (2013.01); *G06F 3/04166* (2019.05)

(58) Field of Classification Search
None
See application file for complete search history.

(56) References Cited

U.S. PATENT DOCUMENTS

| | | | | |
|---|---|---|---|---|
| 9,329,736 B2 * | 5/2016 | Yasue | .................. | G06F 3/04166 |
| 10,928,955 B1 * | 2/2021 | Reed | ................... | G06F 3/04182 |
| 2009/0133510 A1 * | 5/2009 | Witte | ..................... | H03K 17/94 |
| | | | | 73/862.626 |
| 2011/0227846 A1 * | 9/2011 | Imazeki | ................ | G06F 3/0443 |
| | | | | 345/173 |
| 2014/0253454 A1 * | 9/2014 | Caldwell | ............... | G06F 3/0446 |
| | | | | 345/168 |
| 2014/0320383 A1 * | 10/2014 | Goto | ....................... | G06F 3/041 |
| | | | | 345/8 |
| 2016/0085338 A1 * | 3/2016 | Yasue | ................... | G06F 3/0416 |
| | | | | 345/174 |
| 2019/0034031 A1 * | 1/2019 | Liu | ..................... | G06F 3/04182 |
| 2019/0152433 A1 * | 5/2019 | Cumbo | ............. | G07C 9/00714 |
| 2019/0243495 A1 * | 8/2019 | Guo | ................. | G02F 1/134309 |
| 2020/0133428 A1 * | 4/2020 | Chen | ....................... | G06F 3/044 |
| 2021/0311681 A1 * | 10/2021 | Lees | ......................... | G06F 3/14 |
| 2024/0053880 A1 * | 2/2024 | Li | .......................... | G06F 3/0354 |

FOREIGN PATENT DOCUMENTS

JP         07-129321 A     5/1995

* cited by examiner

*Primary Examiner* — David H Chu
(74) *Attorney, Agent, or Firm* — Studebaker & Brackett PC

(57) ABSTRACT

An operation detection device includes a detection unit to detect a touch operation in an operation surface by a detected object and to output a detection value based on a capacitance to increase from before the touch operation, and a determination unit to hold a determination threshold value to determine a start of the touch operation, to output a touch start determination to determine the start of the touch operation when the detection value becomes not less than the determination threshold value, and to output a first deemed determination to determine an end of the touch operation when a first condition, which is based on a maximum detection value after the touch start determination, is satisfied.

6 Claims, 3 Drawing Sheets

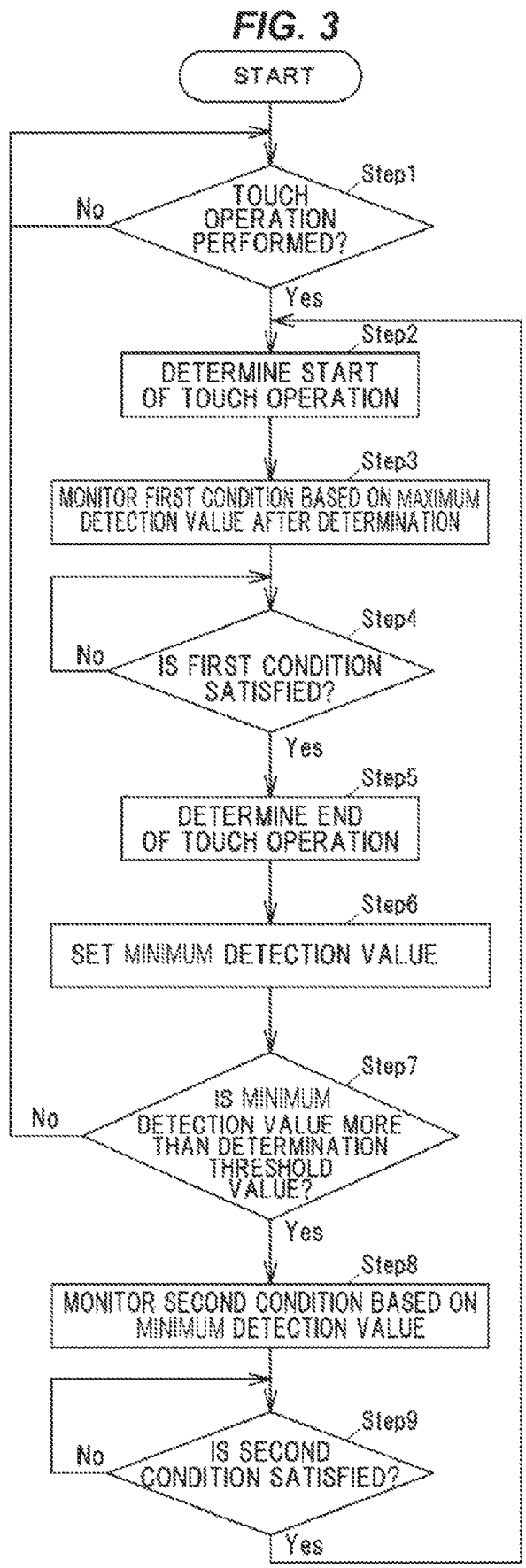

OPERATION DETECTION DEVICE

CROSS-REFERENCE TO RELATED APPLICATIONS

The present patent application claims the priority of Japanese patent application No. 2021/121866 filed on Jul. 26, 2021, and the entire contents of Japanese patent application No. 2021/121866 are hereby incorporated by reference.

TECHNICAL FIELD

The present invention relates to an operation detection device.

BACKGROUND ART

An information input device is known which includes plural electrode wires arranged in X-axis and Y-axis directions and a first detection unit to detect a change in capacitance caused by approach of a finger of an operator to the electrode wires (see, e.g., Patent Literature 1).

This information input device detects XY coordinates of a contact position of a fingertip and outputs the coordinates as coordinate data to a computer, etc.

CITATION LIST

Patent Literature

Patent Literature 1: JP 1407/129321 A

SUMMARY OF INVENTION

In case of the information input device, the change in capacitance caused by approach of the finger depends on the size or shape, etc., of the finger. Therefore, if the sensitivity is increased to suit a finger with a small capacitance change, a finger with a large capacitance change may be detected even in a hovering state due to the increased sensitivity, so that the coordinates detected during the hovering operation may be too unstable to reduce the touch operability.

It is an object of the invention to provide an operation detection device that can suppress the unstableness of coordinates detected during the hovering operation under the increased sensitivity.

According to an aspect of the invention, an operation detection device comprises:
  a detection unit to detect a touch operation in an operation surface by a detected object and to output a detection value based on a capacitance to increase from before the touch operation; and
  a determination unit to hold a determination threshold value to determine a start of the touch operation, to output a touch start determination to determine the start of the touch operation when the detection value becomes not less than the determination threshold value, and to output a first deemed determination to determine an end of the touch operation when a first condition, which is based on a maximum detection value after the touch start determination, is satisfied.

Advantageous Effects of Invention

According to an embodiment of the invention, an operation detection device can be provided that can suppress the unstableness of coordinates detected during the hovering operation under the increased sensitivity.

BRIEF DESCRIPTION OF DRAWINGS

FIG. 3 is a flowchart showing an example of an operation of the operation detection device in the embodiment.

DESCRIPTION OF EMBODIMENTS

Summary of the Embodiments

An operation detection device in the embodiment is generally composed of a detection unit to detect a touch operation in an operation surface by a detected object and to output a detection value based on a capacitance to increase from before the touch operation, and a determination unit to hold a determination threshold value to determine a start of the touch operation, to output a touch start determination to determine the start of the touch operation when the detection value becomes not less than the determination threshold value, and to output a first deemed determination to determine an end of the touch operation when a first condition, which is based on a maximum detection value after the touch start determination, is satisfied.

This operation detection device determines end of touch operation based on the first condition according to the maximum detection value, not based on a fixed threshold value. Therefore, since start and end of touch operation are less likely to be affected by properties, such as size or shape, of a detected object and an erroneous determination that the hovering state of the detected object over the operation surface is detected as a touch operation is suppressed, the operation detection device can appropriately detect touch operations. Thus, the operation detection device can suppress the unstableness of coordinates detected during the hovering operation.

Embodiment (General configuration of an operation detection device 1)

Figure 1A:
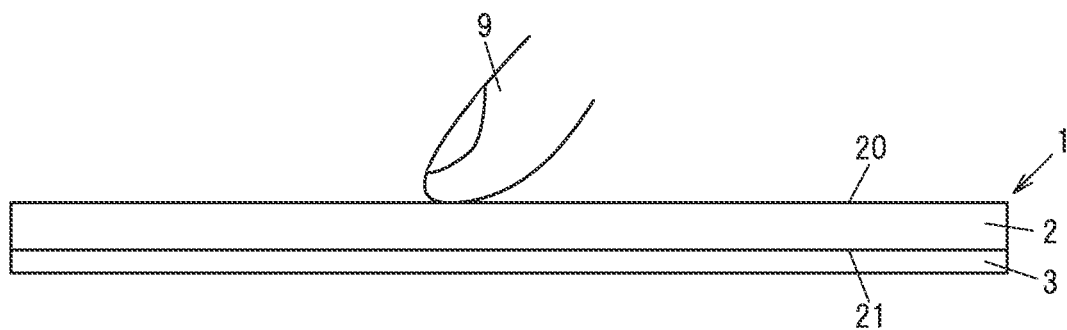
FIGS. 1A and 1B are explanatory diagrams illustrating examples of states of an operating finger relative to an operation surface of an operation detection device in an embodiment.
Figure 1B:
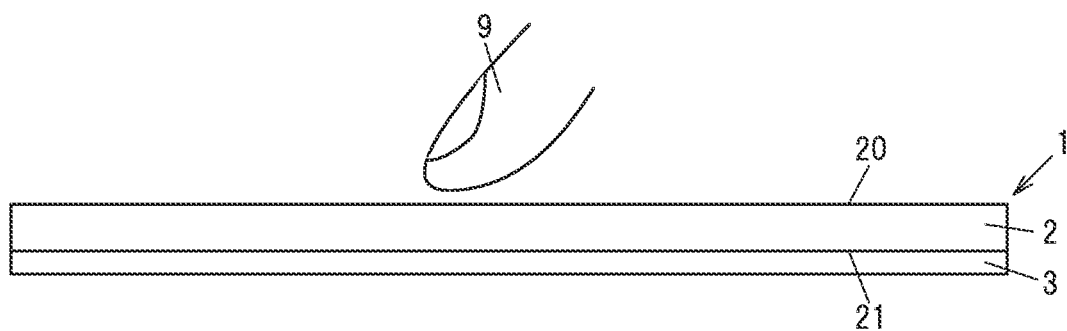
Figure 1C:
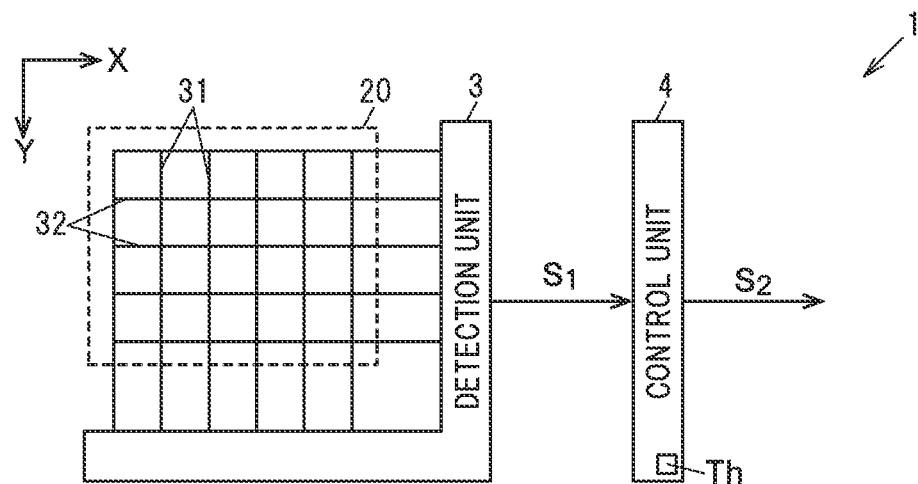
FIG. 1C is an example of a block diagram illustrating the operation detection device.
Figure 2:
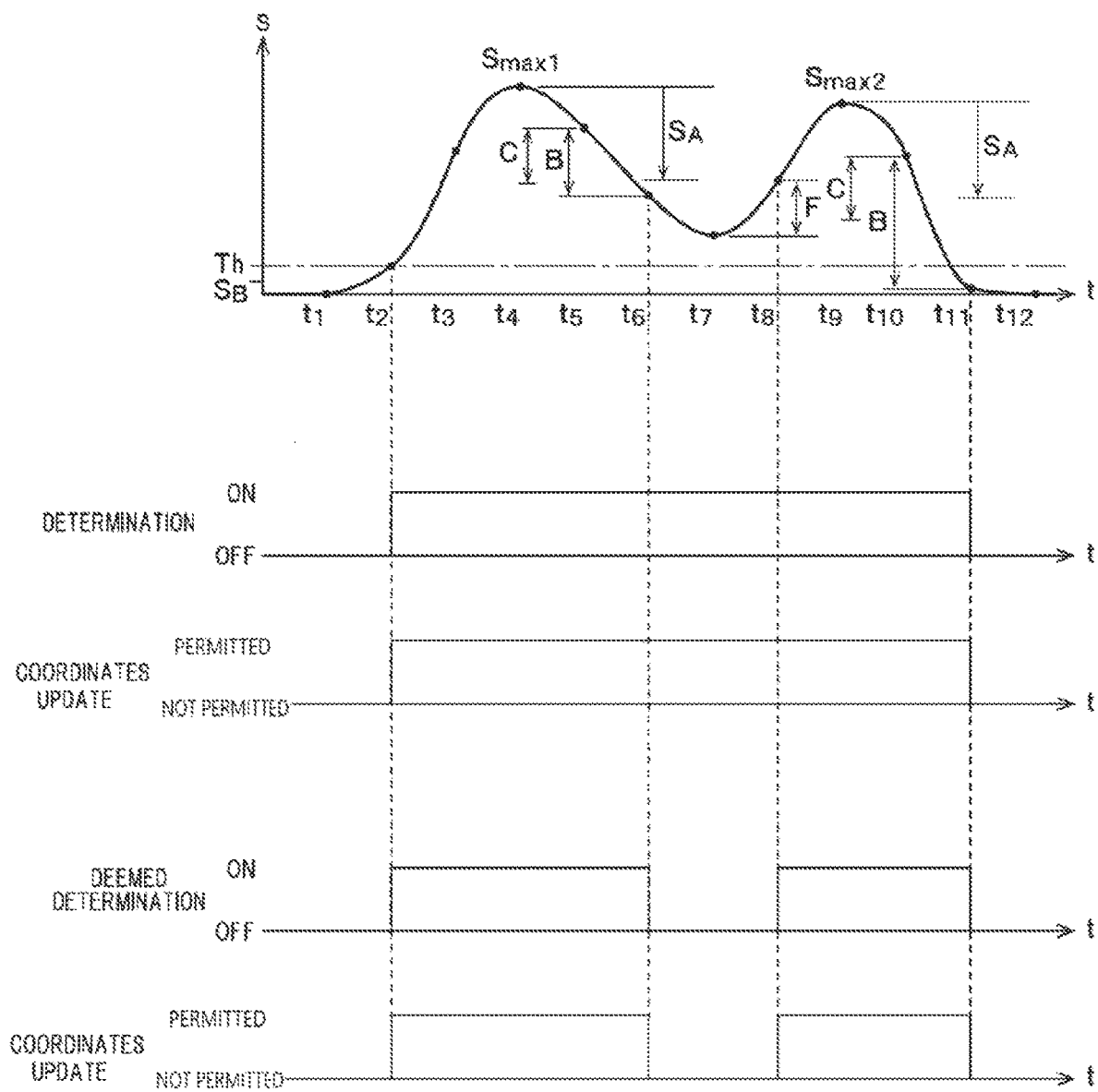
FIG. 2 is an explanatory diagram illustrating an example of how determination is made in the embodiment and in Comparative Example.

FIG. 1A is a diagram illustrating an example state of an operating finger in contact with an operation surface, FIG. 1B is a diagram illustrating an example state of the operating finger away from the operation surface, and FIG. 1C is an example of a block diagram illustrating the operation detection device. FIG. 2 is an explanatory diagram illustrating an example of how determination is made in the embodiment and in Comparative Example. The upper part of FIG. 2 is a diagram illustrating an example of time variation of a detection value S at certain coordinates, where the vertical axis indicates the detection value S at the certain coordinates and the horizontal axis indicates time t. The upper row of the center part of FIG. 2 is an explanatory diagram illustrating an example of how determination of start (ON) and end (OFF) of touch operation is made in Comparative Example, and the lower row of the center part is an explanatory diagram illustrating an example of permission and no permission to update the coordinates in Comparative Example. The upper row of the lower part of FIG. 2 is an explanatory diagram illustrating an example of how determination of start (ON) and end (OFF) of touch operation is made in the embodiment, and the lower row of the lower part is an explanatory diagram illustrating an example of permission and no permission to update the coordinates in the embodiment.

In each drawing of the embodiment described below, a scale ratio or shape may be different from an actual ratio or shape. In addition, in FIG. 1C, flows of main signal and information are indicated by arrows.

The operation detection device 1 in the present embodiment is mounted on a vehicle and used to operate an in-vehicle device of the vehicle, as an example. The operation detection device 1 is used as a touch panel of a center display or a touchpad arranged on a steering wheel, etc., as an example.

As shown in FIGS. 1A to 2, the operation detection device 1 is generally composed of a detection unit 3 that detects a touch operation of touching an operation surface 20 and outputs a detection value S based on capacitance that increases from before touch operation, and a control unit 4 as a determination unit that has a determination threshold value Th to determine start of touch operation, determines a start of a touch operation when the detection value S becomes not less than the determination threshold value Th, and determines an end of the touch operation when a first condition, which is based on a maximum detection value $S_{max}$ after determination, is satisfied.

In addition, when a second condition based on a minimum detection value $S_{min}$ after determining the end of the touch operation is satisfied, the control unit 4 makes a determination that a next touch operation after said touch operation is deemed to be performed.

The touch operation is, e.g., a touch operation, a tracing operation, and a tap operation, etc. Touch operation will be described as the touch operation in the following description, but it is not limited thereto. The detected object to be detected by the detection unit 3 is an operating finger of a user, but it is not limited thereto as long as capacitive coupling is generated between it and detection electrodes, and it may be a portion of the user's body or a special tool such as stylus pen.

The control unit 4 is configured to set following conditions as the first conditions: when the detection value S after determination becomes not more than a predetermined percentage of the maximum detection value $S_{max}$ and when the detection value S falls by not less than a predetermined percentage within a predetermined period of time, and to determine end of touch operation when at least one of them is satisfied.

As an example, the predetermined period of time may be specified by a time period when the detection unit 3 is configured to continuously output the detection value S, or may be specified as a time that is an integer multiple of an output cycle when the detection unit 3 is configured to periodically output the detection value S.

The detection unit 3 in the present embodiment is configured to periodically output the detection value S. Thus, the control unit 4 is configured to periodically acquire the detection value S, set the predetermined period of time to a period of time to acquire a first detection value $S_a$ acquired after the maximum detection value $S_{max}$ and a second detection value $S_b$ next after the first detection value $S_a$, and set a following condition as one of the first conditions: when the second detection value $S_b$ falls from the first detection value $S_a$ by not less than the predetermined percentage.

That is, the control unit 4 is configured to determine end of touch operation when one of the follow/Mg conditions is satisfied: when the maximum detection value $S_{max}$ becomes not more than the predetermined percentage and when, in terms of the relation between the first detection value $S_a$ and the second detection value $S_b$ which are acquired after the maximum detection value $S_{max}$, the second detection value $S_b$ falls from the first detection value $S_a$ by not less than the predetermined percentage.

The control unit is also configured to set a following condition as the second condition: when the detection value S increases from the minimum detection value $S_{min}$ by not less than a predetermined percentage of the determination threshold value Th.

In this regard, when the minimum detection value $S_{min}$ is more than the determination threshold value Th, the control unit 4 cannot determine start of touch operation by the determination threshold value Th and thus sets the second condition. When the minimum detection value is more than the determination threshold value Th, the control unit 4 performs a deemed determination when determining an end of a touch operation by the first condition and when determining a start of a next touch operation after said touch operation by the second condition, and sets the second condition based on the minimum detection value $S_{min}$ during the deemed determination.

(Configuration of the Detection Unit 3)

As shown in FIGS. 1A and 1B, the detection unit 3 is arranged on a back surface 21 side of an operation panel 2, as an example. The operation panel 2 is formed of a resin material and has a plate shape, as an example. The operation surface 20 has a rectangular shape, as an example.

The detection unit 3 is a self-capacitive or mutual-capacitive touch sensor. When the detection unit 3 is self-capacitive, the detection electrodes are aligned in an X-axis direction and a Y-axis direction. In case of the self-capacitive detection unit 3, when an operating finger 9 approaches or comes into contact with the operation surface 20, capacitance of the detection electrode which detected the operating finger 9 increases. Thus, the detection unit 3 may output the detected capacitance as a detection value or may, output a difference from capacitance with no touch operation as a detection value.

The detection unit 3 in the present embodiment is mutual-capacitive, as an example. As shown in FIG. 1B, the detection unit 3 includes plural X-axis detection electrodes 31 aligned so as to intersect the X-axis, and plural Y-axis detection electrodes 32 aligned so as to intersect the Y-axis.

The X-axis detection electrodes 31 and the Y-axis detection electrodes 32 are formed using a highly conductive metal material such as copper, as an example. The X-axis detection electrodes 31 and the Y-axis detection electrodes 32 are composed of plural rectangular detection electrodes electrically connected in line.

The detection unit 3 is configured to drive the Y-axis detection electrodes 32 in turn and read capacitance from the X-axis detection electrodes 31. The detection unit 3 reads capacitance for all combinations of the X-axis detection electrodes 31 and the Y-axis detection electrodes 32 and outputs detection value information $S_1$ which is information related to this capacitance.

In case of the mutual-capacitive detection unit 3, when the operating finger 9 approaches or comes into contact with the operation surface 20, capacitance of the detection electrode which detected the operating finger 9 decreases. Thus, the detection unit 3 may invert the detected capacitance and output it as the detection value S or may output an absolute value of a difference from capacitance with no touch operation as the detection value S. The detection unit 3 in the present embodiment is configured so that the detection value S, which is the difference, increases due to a touch operation and the detection values S at all coordinates are periodically output as the detection value information $S_1$ to the control unit 4.

(Configuration of the Control Unit 4)

The control unit 4 is, e.g., a microcomputer composed of a CPU (Central Processing Unit) performing calculation and processing, etc., of the acquired data according to a stored program, and a RAM (Random Access Memory) and a ROM (Read Only Memory) as semiconductor memories, etc. The ROM stores, e.g., a program for operation of the control unit 4. The RAM is used as, e.g., a storage area to temporarily store calculation results, etc. The control unit 4 also has, inside thereof, a means to generate a clock signal and operates based on the clock signal.

The control unit 4 has the determination threshold value Tb. The control unit 4 determines start (ON) of touch operation when the detection value S becomes not less than the determination threshold value Th. In addition, the control unit 4 does not have a fixed threshold value used to determine end (OFF) of touch operation and determines end of touch operation by the first condition, as described below.

Next, the deemed determination of start and end of touch operation by the control unit 4 will be described in reference to FIG. 2.

Deemed Determination for Touch Operation

The graph of the detection value S in FIG. 2 shows time variation of the detection value S in the case where the operating finger 9 does not sufficiently move away from the operation surface 20 when performing a touch operation once and subsequently performing another touch operation, e.g., as shown in FIGS. 1A and 1B. This detection value S is a detection value at certain coordinates on the operation surface 20, as an example. Two peaks of the detection value S in the graph of FIG. 2 indicate that two touch operations are intentionally performed.

Time $t_1$ to time $t_{12}$ are times at which the detection unit 3 outputted the detection value information $S_1$. That is, time $t_1$ to time $t_{12}$ are equally spaced. The detection value S shown in FIG. 2 begins to increase from time $t_1$ and reaches a maximum detection value $S_{max1}$ at time $t_4$. After that, the detection value S decreases from time $t_4$ to time $t_7$ and then increases and reaches a maximum detection value $S_{max2}$ of the second touch operation at time $t_9$. The detection value S then decreases from time $t_9$ to time $t_{12}$.

Comparative Example

In Comparative Example, start and end of touch operation are determined by the determination threshold value Th. In Comparative Example, start (ON) of touch operation is determined at time $t_2$ at which the detection value S becomes not less than the determination threshold value Th, as shown in FIG. 2.

Then, in Comparative Example, the detection value S becomes not more than the determination threshold value Th at time tit. Therefore, in Comparative Example, it is determined that a touch operation, i.e., contact of the operating finger 9 with the operation surface 20, continues from time $t_2$ to time $t_{11}$. In Comparative Example, based on the detected detection value S, update of the coordinates is permitted between time $t_2$ and time tit during which the determination continues. Therefore, in Comparative Example, the coordinates are calculated at each of times $t_2$ to tit, which causes the unstableness of coordinates detected during the hovering operation.

Present Embodiment

The control unit 4 in the present embodiment determines start (ON) of the first touch operation at time $t_2$ at which the detection value S becomes not less than the determination threshold value Th. The control unit 4 updates the maximum value of the detection value S based on the detection value information $S_1$ that is periodically acquired at the subsequent times $t_3$, $t_4$ . . . .

When the detection value S at time $t_5$ is less than the detection value S at time $t_4$, the control unit 4 determines that the detection value S at time to is the maximum detection value $S_{max1}$ of this touch operation. Then, the control unit 4 sets the first condition based on the maximum detection value $S_{max1}$ at time.

The control unit 4 determines end (OFF) of touch operation when at least one of the following conditions is satisfied: when the detection value S obtained after time $t_5$ becomes not more than a predetermined percentage of the maximum detection value $S_{max1}$ and when the detection value falls by not less than a predetermined percentage within a predetermined period of time.

Firstly, using the following equation (1), the control unit 4 calculates a detection value $S_A$ which is the predetermined percentage of the maximum value $S_{max1}$.

$$\text{Detection value } S_A = \text{Maximum detection value } S_{max1} \times A \tag{1}$$

where $0 < A < 1$.

This coefficient A is 0.5 when the predetermined percentage is 50%, as an example. The coefficient A may be a function.

Each time acquiring the detection value information $S_1$, the control unit 4 calculates whether the detection value S acquired after time $t_5$ is not more than the detection value $S_A$ obtained by the equation (1).

The control unit 4 also monitors whether, after the maximum detection value $S_{max1}$, the second detection value falls from the first detection value by not less than a value C calculated from the maximum detection value $S_{max1}$, i.e., whether a decrease amount B of the detection value from the last detection value falls by not less than the value C calculated from the maximum detection value $S_{max1}$. As an example, the control unit 4 calculates this value C calculated from the maximum detection value $S_{max1}$, using the following equation (2). The value C calculated from the maximum detection value is hereinafter referred to as the calculated value C.

$$\text{Calculated value } C = \text{Maximum detection value } S_{max1} \times D \tag{2}$$

where $0 < D < 1$.

This coefficient D is 0.3, as an example. The coefficient D may be a function. Each time acquiring the detection value information $S_1$, the control unit 4 calculates and checks whether the decrease amount B is not less than the calculated value C.

As shown in FIG. 2, since the detection value S at time to is not more than the detection value $S_A$ and also the decrease amount B is not less than the calculated value C, the control unit 4 determines that both the first conditions are satisfied, and makes a determination that the touch operation is deemed to be ended (OFF). In FIG. 2, start (ON) and end (OFF) of the touch operation based on this deemed determination are between time $t_2$ and time $t_6$.

Subsequently, the control unit 4 updates the minimum value of the detection value S based on the periodically acquired detection value information $S_1$. Since the detection value S increases from time $t_7$ to time $t_8$, the control unit 4 determines that the detection value S at time $t_7$ is the minimum detection value $S_{min}$. This minimum detection value $S_{min}$, is more than the determination threshold value Th, as shown in FIG. 2. That is, in case of determination using the determination threshold value Th, the determination remains "ON" and the coordinates are updated, as shown in Comparative Example.

The control unit 4 sets the second condition based on the minimum detection value $S_{min}$, The control unit 4 monitors whether the detection value S detected after the minimum detection value $S_{min}$ increases from the minimum detection value $S_{min}$ by not less than a predetermined percentage of the determination threshold value Th.

The detection value S detected after the minimum detection value $S_{min}$ is the detection value S detected after time $t_8$, as shown in FIG. 2. Using the following equation (3), the control unit 4 calculates a detection value Su which is the predetermined percentage of the determination threshold value Th.

$$\text{Detection value } S_B = \text{Determination threshold value } Th \times E \quad (3)$$

where 0<E<1.

This coefficient E is 0.5 when the predetermined percentage is 50%, as an example. The coefficient E may be a function.

The control unit 4 calculates an increase amount F of the detection value S after time $t_8$ from the minimum detection value $S_{min}$. The control unit 4 then compares the detection value $S_B$ calculated from the equation (3) to the increase amount F. The control unit 4 determines that the second condition is satisfied at time $t_8$, and makes a deemed determination of start (ON) of the second touch operation, as shown in FIG. 2.

The control unit 4 updates the maximum value of the detection value S based on the detection value information $S_1$ that is periodically acquired at the subsequent times $t_9$, Then, the control unit 4 determines that the detection value S at time $t_9$ is the maximum detection value $S_{max2}$ of the second touch operation. Then, the control unit 4 sets the first condition based on the maximum detection value $S_{max2}$ at time $t_9$.

The control unit 4 checks whether the detection value S acquired after time $t_{10}$ is not more than the detection value $S_A$ obtained from the equation (1). Each time acquiring the detection value information $S_1$, the control unit 4 calculates and checks whether or not the decrease amount B is not less than the calculated value C.

The control unit 4 determines that the first conditions are satisfied at time $t_{11}$, and makes a deemed determination of end (OFF) of the second touch operation. Thus, in the present embodiment shown in FIG. 2, it is determined that the first touch operation is between time $t_2$ and time $t_6$ and the second touch operation is between time $t_8$ to time $t_{11}$. That is, in the present embodiment, update of the coordinates is permitted between time $t_2$ and time to and stopped between time to and time $t_8$ and is then restarted between time $t_8$ and time tip and stopped since time $t_1$ In the present embodiment, the unstableness of coordinates detected during the hovering operation can be suppressed since two intentional touch operations by the user are properly detected.

Although the example in Which two touch operations are performed has been described in FIG. 2, it is not limited thereto. It is possible to make deemed determinations for more touch operations based on the first and second conditions.

Next, an example of an operation of the operation detection device 1 in the present embodiment will be described in reference to the flowchart in FIG. 3.

(Operation)

The control unit 4 of the operation detection device 1 periodically acquires the detection value information $S_1$ from the detection unit 3. When it is "Yes" in Step 1, i.e., when the detection value S based on the detection value information $S_1$ becomes not less than the determination threshold value Th (Step 1: Yes), the control unit 4 determines a start of a touch operation (Step 2).

The control unit 4 updates the maximum detection value after the determination of the touch operation and then monitors whether the first conditions based on the maximum detection value $S_{max}$ are satisfied (Step 3).

When it is "Yes" in Step 4, i.e., when the first conditions are satisfied (Step 4: Yes), the control unit 4 determines an end of the touch operation (Step 5). The control unit 4 updates the minimum detection value based on the detection value S contained in the subsequently acquired detection value information $S_1$ and determines the minimum detection value $S_{min}$ (Step 6).

When the minimum detection value $S_1$ is more than the determination threshold value Th (Step 7: Yes), the control unit 4 monitors, based on the minimum detection value whether the second condition to determine a start of a next touch operation after the touch operation for which the deemed determination is made earlier is satisfied.

When it is "Yes" in Step 9, i.e., when the second condition is satisfied (Step 9: Yes), the control unit 4 proceeds to Step 2 and determines a start of a touch operation.

Here, when the minimum detection value $S_{min}$ is not more than the determination threshold value Th (Step 7: No), the control unit 4 proceeds to Step 1 to determine a touch operation using the determination threshold value Th. In this regard, the control unit 4 updates the coordinates during when it is determined that the touch operation is performed, and outputs operation information $S_2$ based on the calculated coordinates.

Effects of the Embodiment

The operation detection device 1 of the present embodiment can suppress the unstableness of coordinates detected during the hovering operation even under the increased stability. In particular, the operation detection device 1 determines end of touch operation by the first condition based on the maximum detection value $S_{max}$, not by a fixed threshold value, and determines a start of a next touch operation by the second condition based on the minimum detection value $S_{min}$. Therefore, since start and end of touch operation are less likely to be affected by properties, such as size or shape, of the operating finger 9 and an erroneous determination that the hovering state of the operating finger 9 over the operation surface 20 is detected as a touch operation is suppressed, the operation detection device 1 can appropriately detect touch operations as intended by the user. The operation detection device 1 suppresses unnecessary shills of the coordinates and thus can suppress the unstableness of coordinates detected during the hovering operation even under the increased sensitivity.

The operation detection device 1 determines end of touch operation by the first condition based on the maximum detection value $S_{max}$, and thus can determines end of touch operation at an appropriate position in various contact states of the operating finger 9, as compared to when such a configuration is not adapted. The operation detection device 1 can also determine a start of a next touch operation after the end of the previous touch operation by the second condition based on the minimum detection value $S_{min}$ and the determination threshold value Th, and thus can make a deemed determination of touch operation more stably in various contact states of the operating finger 9, as compared to when such a configuration is not adapted.

The operation detection device 1 can be configured so as to reduce the unstableness of coordinates detected during the hovering operation and, therefore, the operability thereof can be improved as compared to the case where the detected coordinates are relatively unstable.

The operation detection device 1 is mounted on a vehicle but can appropriately detect touch operations even when the operating finger 9 does not move away sufficiently from the operation surface 20 due to vibration of the vehicle.

Although some embodiments and modifications of the invention has been described, the embodiments and modifications are merely examples and the invention according to claims is not to be limited thereto. The new embodiments and modifications thereof may be implemented in various other forms, and various omissions, substitutions and changes, etc., can be made without departing from the gist of the invention, in addition, all combinations of the features described in the embodiment and modifications are not necessary to solve the problem of the invention. Further, the embodiments and modifications thereof are included within the scope and gist of the invention and also within the invention described in the claims and the range of equivalency.

REFERENCE SIGNS LIST

1 OPERATION DETECTION DEVICE
3 DETECTION UNIT
4 CONTROL UNIT
20 OPERATION SURFACE

The invention claimed is:

1. An operation detection device, comprising:
a detection unit to detect a touch operation in an operation surface by a detected object and to output a detection value based on a capacitance to increase from before the touch operation; and
a determination unit to hold a determination threshold value to determine a start of the touch operation, to output a touch start determination to determine the start of the touch operation when the detection value becomes not less than the determination threshold value, and to output a first deemed determination; and determine an end of the touch operation when a first condition, which is based on a maximum detection value after the touch start determination, is satisfied,
wherein the first condition is satisfied when the detection value after the touch start determination becomes not more than a predetermined percentage of the maximum detection value or when the detection value after the touch start determination falls by not less than a percentage calculated from the maximum detection value within a predetermined time period, and
wherein the determination unit outputs the first deemed determination to determine the end of touch operation when the first condition is satisfied.

2. The operation detection device according to claim 1, wherein when a second condition based on a minimum detection value after the first deemed determination is satisfied, the determination unit outputs a second deemed determination to determine that a touch operation following the first deemed determination is restarted.

3. The operation detection device according to claim 1, wherein the detection unit periodically outputs the detection value, and wherein the determination unit periodically acquires the detection value, sets the predetermined time period to a time period to acquire a first detection value acquired after the maximum detection value and a second detection value next after the first detection value,
wherein the first condition is satisfied when the second detection value falls from the first detection value by not less than the percentage calculated from the maximum detection value.

4. The operation detection device according to claim 2, wherein the second condition is satisfied when the detection value detected after the minimum detection value increases from the minimum detection value by not less than a predetermined percentage of the determination threshold value.

5. The operation detection device according to claim 2, wherein the determination unit updates base based on the detection value a coordinate to indicate a position of the touch operation in the operation surface by the detected object, wherein the determination unit prohibits the update of the coordinate within a time period from the output of the first deemed determination to the second deemed determination.

6. The operation detection device according to claim 2, wherein the determination unit monitors whether the second condition is satisfied if the minimum detection value is not less than the determination threshold value, wherein the determination unit stops the monitoring if the minimum detection value is less than the determination threshold value.

* * * * *